United States Patent
Chen et al.

(10) Patent No.: US 10,282,818 B2
(45) Date of Patent: May 7, 2019

(54) IMAGE DEFORMATION PROCESSING METHOD, DEVICE AND STORAGE MEDIUM

(71) Applicant: TENCENT TECHNOLOGY (SHENZHEN) COMPANY LIMITED, Shenzhen, Guangdong (CN)

(72) Inventors: Xiaoyi Chen, Shenzhen (CN); Yang Lu, Shenzhen (CN); Hao Feng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/696,579

(22) Filed: Sep. 6, 2017

(65) Prior Publication Data

US 2017/0372451 A1 Dec. 28, 2017

Related U.S. Application Data

(63) Continuation of application No. PCT/CN2016/086653, filed on Jun. 22, 2016.

(30) Foreign Application Priority Data

Jul. 30, 2015 (CN) .......................... 2015 1 0460354

(51) Int. Cl.
  *G09G 5/00* (2006.01)
  *G06T 3/40* (2006.01)
  *G06T 3/00* (2006.01)

(52) U.S. Cl.
  CPC ................ *G06T 3/403* (2013.01); *G06T 3/00* (2013.01)

(58) Field of Classification Search
  CPC ......... G06F 3/0481; G06F 2203/04805; G06T 5/006; G06T 3/0093; G06T 3/0018
  (Continued)

(56) References Cited

U.S. PATENT DOCUMENTS 8,494,230 B2 * 7/2013 Kobayashi ............ G06T 3/0093
                                                     382/118
2004/0247171 A1 12/2004 Hashimoto et al.
(Continued)

FOREIGN PATENT DOCUMENTS

CN         1565000 A    1/2005
CN       101496028 A    7/2009
(Continued)

OTHER PUBLICATIONS

Graphic Design, shapes—How can I alter a square image into a circular one in Sketch?—Graphic Design Stack Exchange, May 31, 2015. [online], [retrieved on Feb. 19, 2018]. Retrieved from the Internet <URL: https://graphicdesign.stackexchange.com/questions/35196/how-can-i-alter-a-square-image-into-a-circular-one-in-sketch>.*

(Continued)

*Primary Examiner* — Gordon G Liu
(74) *Attorney, Agent, or Firm* — Morgan, Lewis & Bockius LLP

(57) ABSTRACT

An image deformation method and an image deformation device are provided. The method includes: acquiring an original image, and acquiring a target shape; deforming the original image into a target image based on a ratio of deformation at a center of the original image to deformation at an edge of the original image, wherein the further the edge of the target image is away from the center of the target image, the greater a deforming degree of the edge of the (Continued)

target image is, and a shape of the target image is the target shape; and displaying the target image.

18 Claims, 5 Drawing Sheets

(58) Field of Classification Search
 USPC .......................................................... 345/647
 See application file for complete search history.

(56) References Cited

U.S. PATENT DOCUMENTS

2006/0265202 A1 11/2006 Muller-Fischer et al.
2014/0192370 A1 7/2014 Kurigata

FOREIGN PATENT DOCUMENTS

| CN | 103810739 A | 5/2014 |
| CN | 103927712 A | 7/2014 |

OTHER PUBLICATIONS

International Search Report with Translation for International Application No. PCT/CN2016/086653 dated Sep. 12, 2016, 13 pages.

\* cited by examiner

IMAGE DEFORMATION PROCESSING METHOD, DEVICE AND STORAGE MEDIUM

The present application is a continuation of International Patent Application No. PCT/CN2016/086653 filed on Jun. 22, 2016, which claims priority to Chinese Patent Application No. 201510460354.9, titled "IMAGE DEFORMATION PROCESSING METHOD AND DEVICE", filed on Jul. 30, 2015 with the State Intellectual Property Office of People's Republic of China, both of which are incorporated herein by reference in their entireties.

FIELD

The present disclosure relates to the field of computer technology, and in particular to an image deformation method, an image deformation device and a storage medium.

BACKGROUND

Image deformation is a process of changing a shape of an original image. For example, in an existing method, a shape of an original image is changed by setting a control point on the image, moving a mouse to the control point and then pressing and dragging the mouse to deform the image accordingly, which is difficult to control the desired shape.

SUMMARY

Provided in embodiments of the present disclosure are an image deformation method and an image deformation device.

The embodiment of the present disclosure provides an image deformation method, which includes:
acquiring an original image, and acquiring a target shape;
deforming the original image into a target image based on a ratio of deformation at a center of the original image to deformation at an edge of the original image, where the further an edge of the target image is away from a center of the target image, the greater a deforming degree of the edge of the target image is, and a shape of the target image is the target shape; and
displaying the target image.

The embodiment of the present disclosure provides an image deformation device, which includes:
an image acquisition unit, configured to acquire an original image;
a shape acquisition unit, configured to acquire a target shape;
a deforming unit, configured to deform the original image into a target image based on a ratio of deformation at a center of the original image to deformation at an edge of the original image, where the further an edge of the target image is away from a center of the target image, the greater a deforming degree of the edge of the target image is, and a shape of the target image is the target shape; and
a displaying unit, configured to display the target image.

The embodiment of the present disclosure provides an image deformation device, which includes: one or more processors, configured to execute program instructions stored in storage medium to make the image deformation device perform an image deformation method. The method includes:
acquiring an original image, and acquiring a target shape;
deforming the original image into a target image based on a ratio of deformation at a center of the original image to deformation at an edge of the original image, where the further an edge of the target image is away from a center of the target image, the greater a deforming degree of the edge of the target image is, and a shape of the target image is the target shape; and
displaying the target image.

The embodiment of the present disclosure provides an image deformation medium, which includes program instructions. The program instruction, when executed by a processor of a calculating device, configures the storage medium to perform an image deformation method. The method includes:
acquiring an original image, and acquiring a target shape;
deforming the original image into a target image based on a ratio of deformation at a center of the original image to deformation at an edge of the original image, where the further an edge of the target image is away from a center of the target image, the greater a deforming degree of the edge of the target image is, and a shape of the target image is the target shape; and
displaying the target image.

With technical solutions provided in embodiments of the present disclosure, a user only needs to input an original image and a target shape, and then the process of image deformation is completed automatically without any operations performed by the user on the original image with a mouse, leading to an easy operation and a high precision. Moreover, a user can designate a target shape at his option to deform an original image into the designated target shape, thereby leading to flexible control of the image deforming.

BRIEF DESCRIPTION OF THE DRAWINGS

The accompanying drawings to be used in the description of the embodiments are described briefly as follows, so that the technical solutions according to the embodiments in the present disclosure become clearer. It is apparent that the accompanying drawings in the following description only illustrate some embodiments of the disclosure. For those skilled in the art, other drawings may be obtained based on these accompanying drawings and fall within the present disclosure.

DETAILED DESCRIPTION OF EMBODIMENTS

The purposes, technical solutions and advantages of the present disclosure will be described below clearly and fully with reference to the drawings in the embodiments of the disclosure, with the described embodiments being only a part, rather than all of, the embodiments of the disclosure. Based upon the embodiments of the disclosure, other embodiments derived by those ordinarily skilled in the art effort shall come into the scope of the disclosure.

Figure 1:
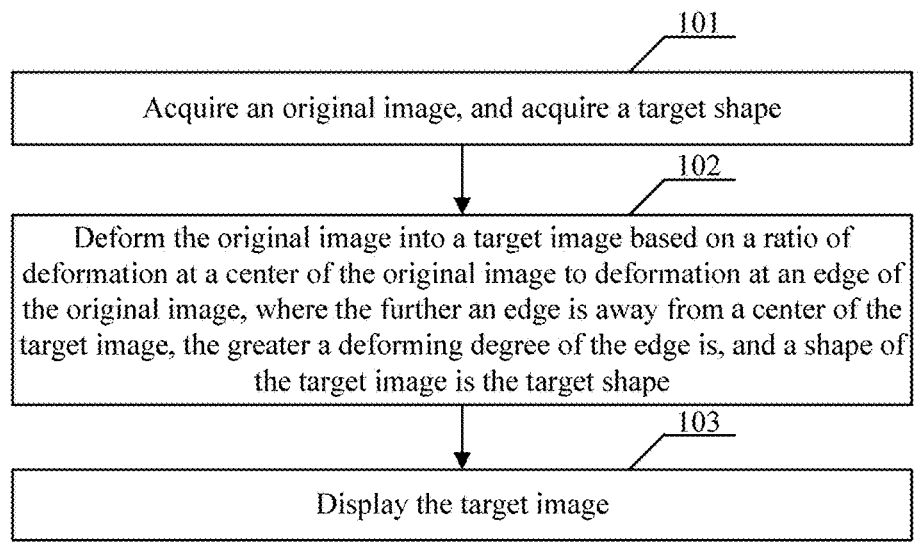
FIG. 1 is a flow chart of a method according to an embodiment of the present disclosure.

An image deformation method is provided in the embodiment of the present disclosure, as shown in FIG. 1. The method includes the following steps 101-103.

In step 101, an original image is acquired, and a target shape is acquired.

The original image is a material image for a process of image deformation, that is, an image to be deformed. A target shape is a shape of a deformed image, that is, the original image is required to be deformed into the target shape after the process of image deformation. The target shape may be designated freely depending on a user requirement, which may be a shape of a graph drawn by a user and may be a shape selected from predefined shapes as well, which is not limited in embodiments of the present disclosure.

In step 102, the original image is deformed into a target image based on a ratio of deformation at a center of the original image to deformation at an edge of the original image, such that the further an edge of the target image is away from a center of the target image, the greater a deforming degree of the edge of the target image is, and a shape of the target image is the target shape.

In the embodiment, the center of the original image may be a geometric center of the original image, and may be a central position designated by a user for reference as well. It does not have to be an absolute geometric center of the original image. If the manner that a user designates a central position for reference is adopted, then a geometric center of the original image is a default center of the original image, and after a central position designated by a user is received, the designated central position is taken as the center of the original image.

In step 103, the target image is displayed.

Displaying the target image is to output a result of the process of image deformation, thereby facilitating a check on the effect of the process of image deformation. Hence the user can confirm or modify the result of the process of image deformation.

With the embodiment of the present disclosure, a user only needs to input an original image and a target shape, and then the process of image deformation is completed automatically without any operations performed by the user on the original image with a mouse, leading to an easy operation and a high precision. Moreover, a user can designate a target shape at his option to deform an original image into the designated target shape, thereby leading to flexible control of the image deforming.

In the embodiment of the present disclosure, the target shape is a shape of the deformed image, that is, an original image is required to be deformed into the target shape after a process of image deformation. The target shape may be designated freely depending on a user requirement, and it may be a shape of a graph drawn by a user, and may be a shape selected from predefined shapes as well. For example, the step of acquiring a target shape includes: receiving a drawn graph, and determining a shape of the drawn graph as a target shape; or receiving a graph selected from predefined graphs, and determine a shape of the selected graph as a target shape.

The deforming in the embodiment may be a whole image deforming, or may be a local image deforming. A preferred implementation solution is provided in the embodiment, which may include: fragmenting the original image first, deforming all image fragments of the fragmented image, and stitching all the deformed image fragments of the fragmented image. For example, the step of deforming the original image into a target image based on a ratio of deformation at a center of the original image to deformation at an edge of the original image includes: fragmenting the original image; deforming all image fragments of the fragmented image based on the ratio of deformation at a center of the original image to deformation at an edge of the original image; and stitching all the deformed image fragments of the fragmented image to acquire the target image.

Since the further an edge of the target image is way from a center of the target image, the greater a deforming degree is, in the deforming process after fragmenting the original image, the closer an image fragment is to an edge, the greater a deforming degree of the edge of the target image is, and an image fragment in a central region has a low deforming degree. Therefore, it can avoid over-fragment of the original image, which decreases the amount of calculations for subsequent operations like the image stitching. For example, the step of fragmenting the original image includes: fragmenting the original image into image fragments, such that the further an image fragment is away from the center of the original image, the smaller an area of the image fragment is.

Based on requirements in practice, an association between a target shape and an original image may be established according to an embodiment of the present disclosure. When an association between a target shape and an original image is established, an electronic device can determine the requirement of deforming the original image into the target shape. For example, before deforming an original image into a target image, the method further includes: receiving a command of dragging the original image to the target shape, or receiving a command of selecting the target shape. Then the step of deforming the original image into the target image is performed.

In the embodiment of the present disclosure, a deforming proportion parameter may be used to control a deforming ratio of deformation of image fragments near an edge to deformation of image fragments at a central position. The bigger the deforming ratio is, the greater a deforming degree of an image fragment near an edge position is; otherwise, the smaller the deforming degree is. In the embodiment, an interface for adjusting the deforming proportion parameter may be provided to receive a user input. For example, after displaying the target image, or before deforming the original image into the target image, the method further includes: displaying an adjusting interface for a deforming proportion parameter, and receiving a value of the deforming proportion parameter.

There are many specific implementations of providing an interface for adjust the deforming proportion parameter to receive a user input, and two optional implementations are provided in the embodiment as examples. It should be noted that, any modes of inputting a parameter may be applied in the embodiment of the present disclosure, and the following example should not be considered as limitations of the embodiment of the present disclosure. For example, the adjusting interface may include an interface for adjusting the deforming proportion parameter through a slider, or an interface for adjusting the deforming proportion parameter through a parameter input box.

An image deformation method provided in an embodiment of the present disclosure includes the following steps 1 to 3.

In step 1, a shape is designated, for example, an ellipse is drawn.

In step 2, an original picture is associated with the designated shape.

The above original picture is an original image, and a designated shape is a target shape. The association operation is a process of determining a requirement for deforming a shape of the original picture into the designated shape. For example, the original picture may be dragged into the designated shape.

In step 3, an image deforming process is performed.

The step 3 is executed by a device, which may include the following steps 3.1 to 3.3.

Figure 2:
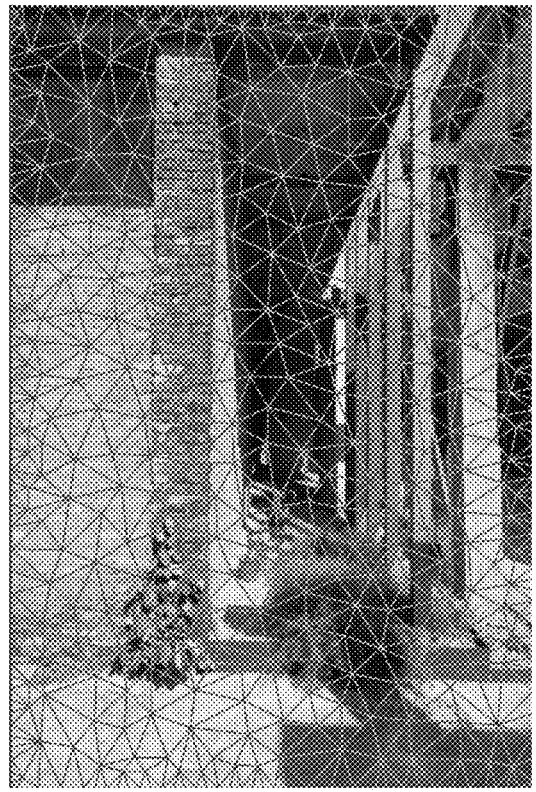
FIG. 2 is a schematic diagram showing image fragmentation according to an embodiment of the present disclosure.

In step 3.1, the original image is fragmented, to fragment the whole image into many small fragments. Thus when image compression or image stretching is performed, a relationship of compression degrees or stretching degrees of an image edge and an image center is controlled. FIG. 2 is a schematic diagram showing the fragmented original image.

In step 3.2, all fragments of the image are deformed and combined to form a final image based on the designated shape and a default deforming proportion relationship between an image edge and an image center. An image obtained through stitching and combination after being deformed is shown in FIG. 3, and the image is in the designated shape, which is an ellipse for example.

In step 3.3, an adjustable parameter is provided to control a ratio of deformation of an edge picture to deformation of a central picture for example.

Figure 3:
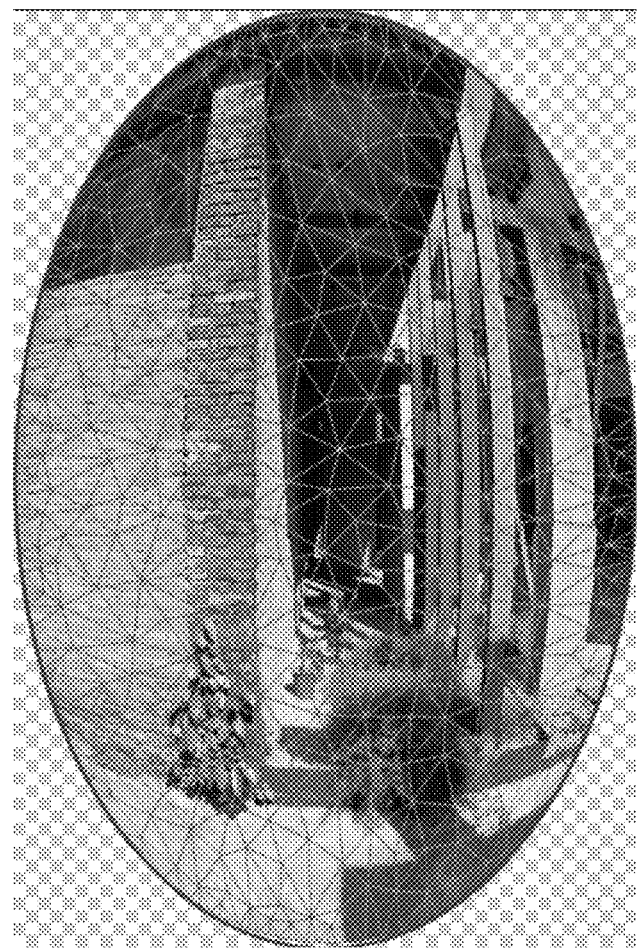
FIG. 3 is a schematic diagram showing image deforming and stitching of a fragmented image according to an embodiment of the present disclosure.
Figure 4:
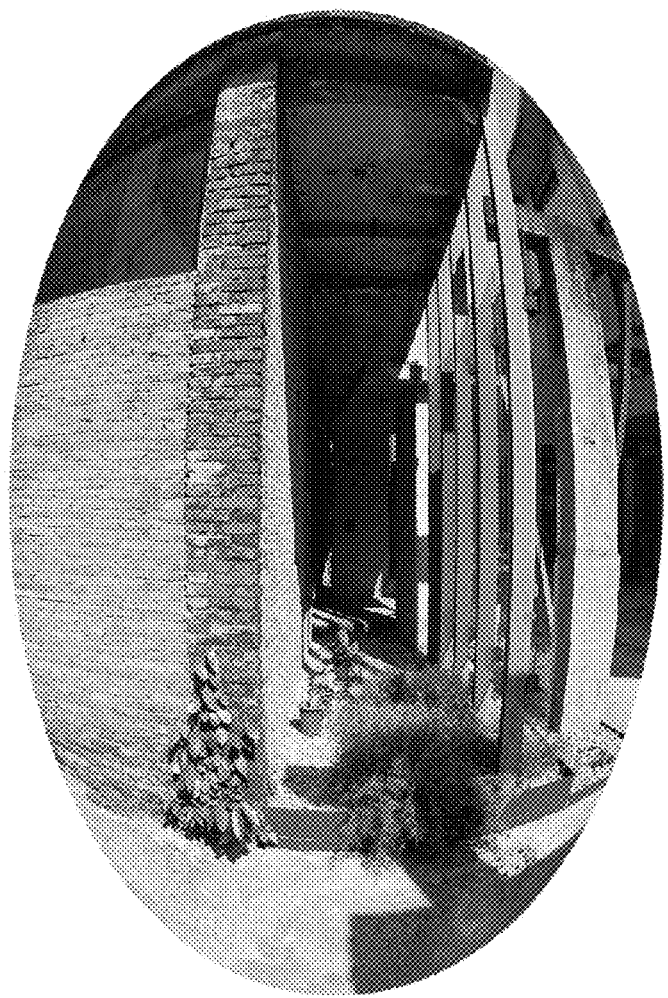
FIG. 4 is a schematic diagram showing an image deformation result of a fragmented image according to an embodiment of the present disclosure.
Figure 5:
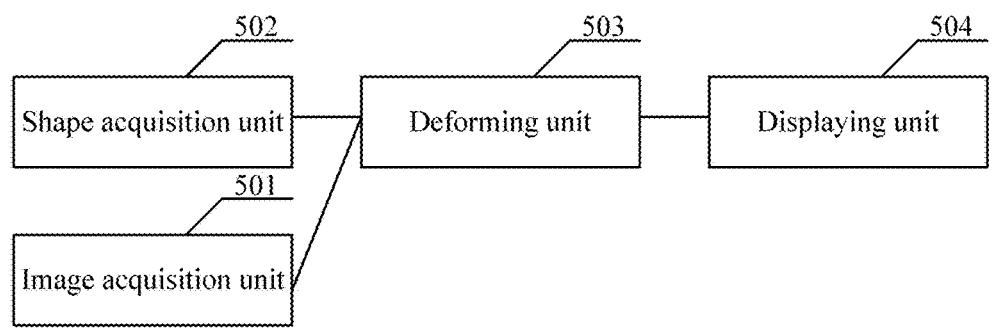
FIG. 5 is a structural schematic diagram of a device according to an embodiment of the present disclosure.

It can be seen from FIG. 3, the image edge is compressed seriously while the image center is hardly affected. By adding an adjustable parameter, the ratio of deformation of fragments near the image edge to deformation of fragments in the image center is controlled, thereby improving deforming uniformity. FIG. 4 shows a deforming result of an image, which may be displayed to a user.

According to the embodiment of the present disclosure, controllable image deforming may be performed quickly by designating a shape and selecting a picture. The existing image deforming technology is based on an original image, and is realized by manually modifying the original image step by step to approach a desired result. While the method provided in embodiments of the present disclosure is based on an expected shape, and is realized by deforming automatically an original image according to a designated result. Moreover, the deforming degree at positions near the image edge and in the image center is controllable.

An image deformation device is also provided in an embodiment of the present disclosure, as shown in Figure. The device includes an image acquisition unit 501, a shape acquisition unit 502, a deforming unit 503 and a displaying unit 504.

The image acquisition unit 501 is configured to acquire an original image.

The shape acquisition unit 502 is configured to acquire a target shape.

The deforming unit 503 is configured to deform the original image into a target image based on a ratio of deformation at the center of the original image to deformation at an edge of the original image, such that the further an edge of the target image is away from a center of the target image, the greater a deforming degree of the edge of the target image is, and a shape of the target image is the target shape.

The displaying unit 504 is configured to display the target image.

The original image is a material image for an image deforming process, that is, an image to be deformed. A target shape is a shape of a deformed image, that is, the original image is required to be deformed into the target shape after an image deforming process. The target shape may be designated freely depending on a user requirement, which may be a shape of a graph drawn by a user and may be a shape selected from predefined shapes as well, which is not limited in embodiments of the present disclosure.

In the embodiment, the center of the original image may be a geometric center of the original image and may be a central position designated by a user for reference as well. It does not have to be an absolute geometric center of the original image. If the manner that a user designates a central position for reference is adopted, then a geometric center of the original image is a default center of the original image, and after a central position designated by a user is received, the designated central position is taken as the center of the original image.

Displaying the target image is to output a result of the image deforming process, thereby facilitating a check on the effect of the image deforming process. Hence the user can confirm or modify the result of the image deforming process.

With the embodiment of the present disclosure, a user only needs to input an original image and a target shape, and then the image deforming process is completed automatically without any operations performed by the user on the original image with a mouse, leading to an easy operation and a high precision. Moreover, a user can designate a target shape at his option to deform an original image into the designated target shape, thereby leading to flexible control of the image deforming.

In the embodiment of the present disclosure, the target shape is a shape of the deformed image, that is, an original image is required to be deformed into the target shape after an image deforming process. The target shape may be designated freely depending on a user requirement, and it may be a shape of a graph drawn by a user, and may be a shape selected from predefined shapes as well. For example, the shape acquisition unit 502 is configured to receive a drawn graph, and determine a shape of the drawn graph as a target shape; or receive a graph selected from predefined graphs, and determine a shape of the selected graph as a target shape.

The deforming in the embodiment may be a whole image deforming, or may be a local image deforming. A preferred implementation solution is provided in the embodiment, which may include: fragmenting an original image first, deforming all image fragments of the fragmented image, and stitching all the deformed image fragments of the fragmented image. For example, the deforming unit 503 is configured to: fragment the original image; deform all image fragments of the fragmented image based on the ratio of deformation at the center of the original image to deformation at an edge of the original image; and stitch all the deformed image fragments of the fragmented image to acquire the target image.

Since the further an edge of the target image is way from a center of the target image, the greater a deforming degree is, in the deforming process after fragmenting the original image, the closer an image fragment is to an edge, the greater the deforming degree of the image fragment is, and an image fragment in a central region has a low deforming degree. Therefore, it can avoid over-fragment of the original image, which decreases the amount of calculations for subsequent operations like the image stitching. For example, the deforming unit 503 is configured to fragment the original image such that the further an image fragment is away from the center of the original image, the smaller an area of the image fragment is.

Figure 6:
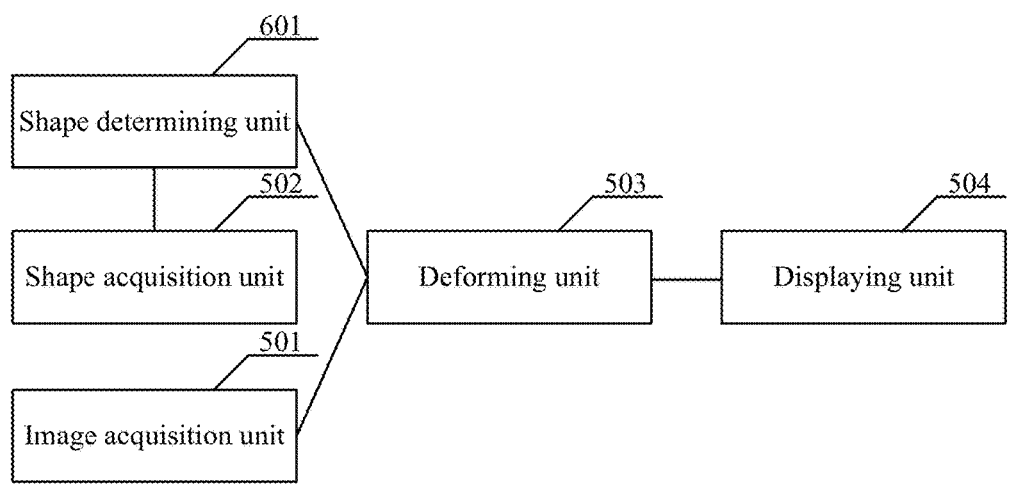
FIG. 6 is a structural schematic diagram of a device according to an embodiment of the present disclosure.

Based on requirements in practice, an association between a target shape and an original image may be established according to an embodiment of the present disclosure. When an association between a target shape and an original image is established, an electronic device can determine the requirement of deforming the original image into the target shape. For example, as shown in FIG. 6, the device further includes a shape determining unit 601.

The shape determining unit 601 is configured to receive a command of dragging the original image to the target shape, or receive a command of selecting the target shape before the deforming unit 503 deforms the original image into a target image.

Figure 7:
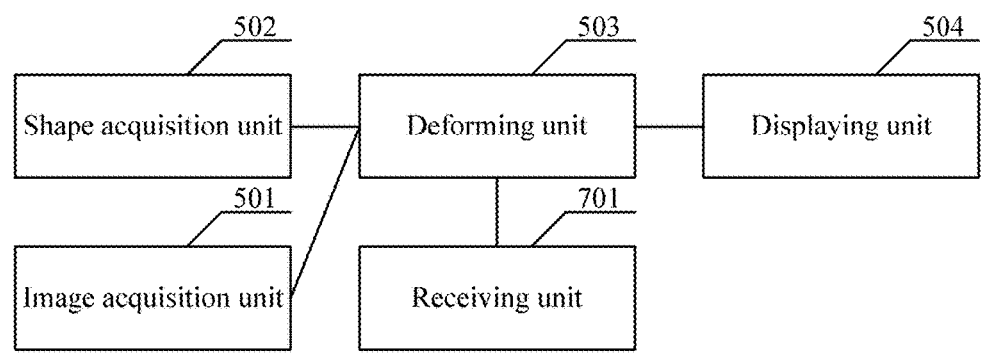
FIG. 7 is a structural schematic diagram of a device according to an embodiment of the present disclosure.

In the embodiment of the present disclosure, a deforming proportion parameter may be used to control a deforming ratio of deformation of image fragments near an edge position to deformation of image fragments in a central position. The bigger the deforming ratio is, the greater a deforming degree of an image fragment near an edge position is; otherwise, the smaller the deforming degree is. In the embodiment, an interface for adjusting the deforming proportion parameter may be provided to receive a user input. For example, the displaying unit 504 is further configured to display an adjusting interface for a deforming proportion parameter after the target image is displayed or before the deforming unit 503 deforms the original image into a target image. As shown in FIG. 7, the device further includes a receiving unit 701.

The receiving unit 701 is configured to receive a value of the deforming proportion parameter.

There are many specific implementations of providing an interface for adjust the deforming proportion parameter to receive a user input, and two optional implementations are provided in the embodiment as examples. It should be noted that, any modes of inputting a parameter may be applied in the embodiment of the present disclosure, and the following example should not be considered as limitations of the embodiment of the present disclosure. For example, the displaying unit 504 is further configured to display an interface for adjusting the deforming proportion parameter through a slider, or an interface for adjusting the deforming proportion parameter through a parameter input box.

Figure 8:
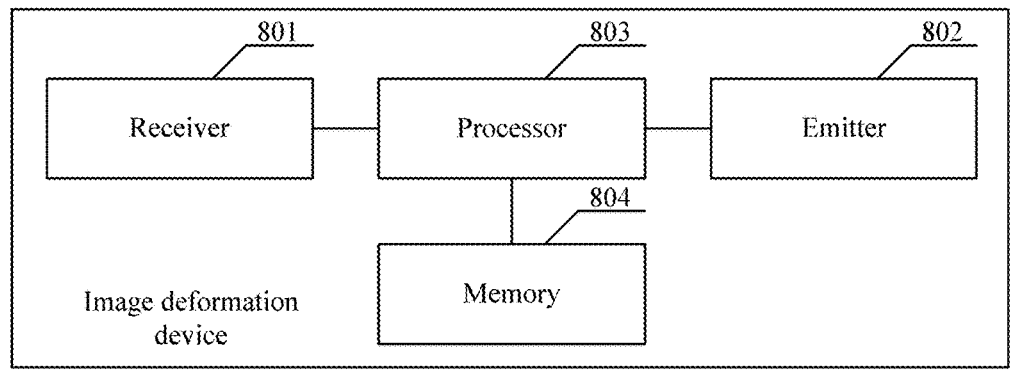
FIG. 8 is a structural schematic diagram of a device according to an embodiment of the present disclosure.

Another image deformation device is provided in an embodiment of the present disclosure, as shown in FIG. 8. The device includes: a receiver 801, an emitter 802, a processor 803 and a memory 804.

The processor 803 is configured to: acquire an original image and acquire a target shape; deform the original image into a target image based on a ratio of deformation at the center of the original image to deformation at an edge of the original image, such that the further an edge of the target image is away from a center of the target image, the greater a deforming degree of the edge of the target image is, and a shape of the target image is the target shape; and display the target image.

The original image is a material image for an image deforming process, that is, an image to be deformed. A target shape is a shape of a deformed image, that is, the original image is required to be deformed into the target shape after an image deforming process. The target shape may be designated freely depending on a user requirement, which may be a shape of a graph drawn by a user and may be a shape selected from predefined shapes as well, which is not limited in embodiments of the present disclosure.

In the embodiment, the center of the original image may be a geometric center of the original image and may be a central position designated by a user for reference as well. It does not have to be an absolute geometric center of the original image. If the manner that a user designates a central position for reference is adopted, then a geometric center of the original image is a default center of the original image, and after a central position designated by a user is received, the designated central position is taken as the center of the original image.

Displaying the target image is to output a result of the image deforming process, thereby facilitating a check on the effect of the image deforming process. Hence the user can confirm or modify the result of the image deforming process.

With the embodiment of the present disclosure, a user only needs to input an original image and a target shape, and then the image deforming process is completed automatically without any operations performed by the user on the original image with a mouse, leading to an easy operation and a high precision. Moreover, a user can designate a target shape at his option to deform an original image into the designated target shape, thereby leading to flexible control of the image deforming.

In the embodiment of the present disclosure, the target shape is a shape of the deformed image, that is, an original image is required to be deformed into the target shape after an image deforming process. The target shape may be designated freely depending on a user requirement, which may be a shape of a graph drawn by a user and may be a shape selected from predefined shapes as well. For example, the processor 803 is configured to acquire a target shape by receiving a drawn graph, and determining a shape of the drawn graph as a target shape, or receiving a graph selected from predefined graphs, and determining a shape of the selected graph as a target shape.

The deforming in the embodiment may be a whole image deforming, or may be a local image deforming. A preferred implementation solution is provided in the embodiment, which may include: fragmenting an original image first, deforming all image fragments of the fragmented image, and stitching all the deformed image fragments of the fragmented image. For example, the processor 803 is configured to deform the original image into the target image based on a ratio of deformation at the center of the original image to deformation at an edge of the original image, by fragmenting the original image; deforming all image fragments of the fragmented image based on the ratio of deformation at the center of the original image to deformation at an edge of the original image; and stitching all the deformed image fragments of the fragmented image to acquire the target image.

Since the further an edge of the target image is way from a center of the target image, the greater a deforming degree of the edge is, in the deforming process after fragmenting the original image, the closer an image fragment is to an edge, the greater the deforming degree of the image fragment is, and an image fragment in a central region has a low deforming degree. Therefore, it can avoid over-fragment of the original image, which decreases the amount of calculations for subsequent operations like the image stitching. For example, the processor 803 is configured to fragment the original image by fragmenting the original image into image fragments such that the further an image fragment is away from the center of the original image, the smaller an area of the image fragment is.

Based on requirements in practice, an association between a target shape and an original image may be established according to an embodiment of the present disclosure. When an association between a target shape and an original image is established, an electronic device can determine the requirement of deforming the original image into the target shape. For example, the processor 803 is further configured to: receive a command of dragging the original image to the target shape or receive a command of selecting the target shape before the original image is deformed into a target image; and execute the step of deforming the original image into a target image.

In the embodiment of the present disclosure, a deforming proportion parameter may be used to control a deforming ratio of deformation of image fragments near an edge position to deformation of image fragments in a central position. The bigger the deforming ratio is, the greater a deforming degree of an image fragment near an edge position is; otherwise, the smaller the deforming degree is. In the embodiment, an interface for adjusting the deforming proportion parameter may be provided to receive a user input. For example, the processor 803 is further configured to display an adjusting interface for a deforming proportion parameter after the target image is displayed or before the original image is deformed into a target image, and receive a value of the deforming proportion parameter.

There are many specific implementations of providing an interface for adjust the deforming proportion parameter to receive a user input, and two optional implementations are provided in the embodiment as examples. It should be noted that, any modes of inputting a parameter may be applied in the embodiment of the present disclosure, and the following example should not be considered as limitations of the embodiment of the present disclosure. For example, the adjusting interface may include an interface for adjusting the deforming proportion parameter through a slider, or an interface for adjusting the deforming proportion parameter through a parameter input box.

Figure 9:
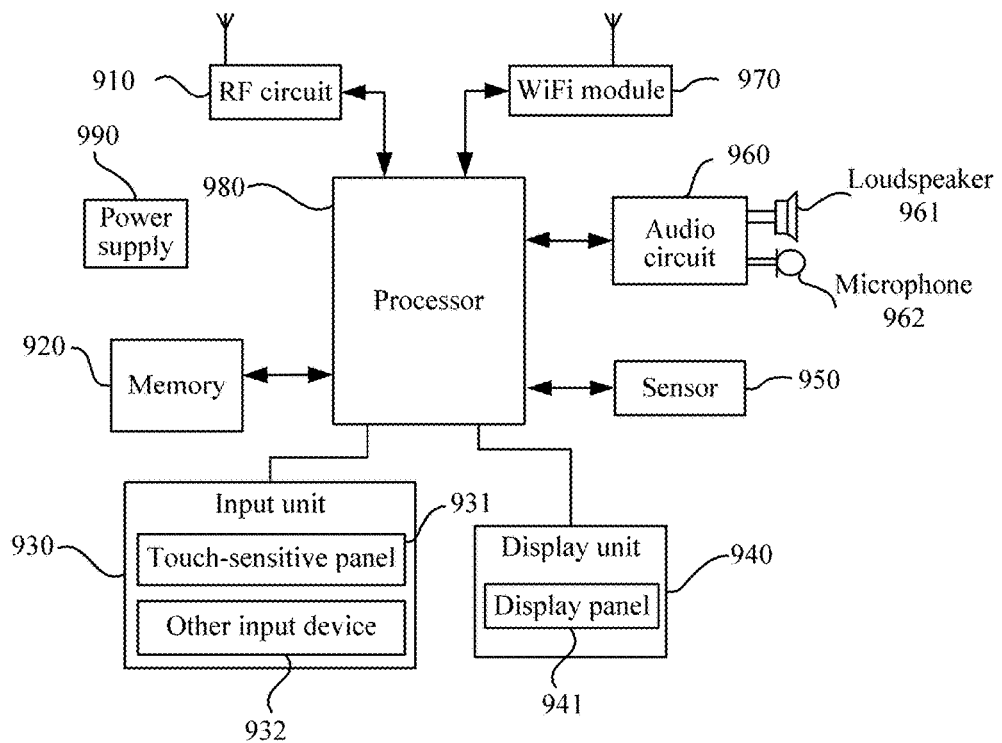
FIG. 9 is a structural schematic diagram of a device according to an embodiment of the present disclosure.

Another image deformation device is provided in an embodiment of the present disclosure, as shown in FIG. 9. Only contents relevant to the embodiment of the present disclosure are illustrated for convenient description. For the specific technical details which are not described here, one may refer to the methods in the above embodiments of the present disclosure. The terminal may include a mobile phone, a tablet computer, a personal digital assistant (PDA), a point of sales (POS), an onboard computer and any other terminal devices. A mobile phone is taken as an example for illustration hereinafter.

FIG. 9 shows part of a structure of a mobile phone relevant to a terminal provided in the embodiment of the present disclosure. As shown in FIG. 9, the mobile phone includes: a radio frequency (RF) circuit 910, a memory 920, an input unit 930, a display unit 940, a sensor 950, an audio circuit 960, a wireless fidelity (WiFi) module 970, a processor 980 and a power supply 990, etc. It can be understood by those skilled person in the art that, the mobile phone is not limited to the structure shown in FIG. 9, which may include more or less components than the mobile phone in FIG. 9, or may include a combination of the components, or have different arrangements of the components.

Detailed descriptions of each component of a mobile phone are made in conjunction with FIG. 9 hereinafter.

The RF circuit 910 may be configured to receive and send a signal during a process of receiving and sending information or during a call, especially, to receive downlink information of a base station and deliver it to the processor 980 for processing; and to send an involved uplink data to a base station. Generally, the RF circuit 910 includes but is not limited to an antenna, at least one amplifier, a transceiver, a coupler, a low noise amplifier (LNA) and a duplexer, etc. Additionally, the RF circuit 910 can also communicate with a network or other devices through wireless communications. The wireless communications may use any communication standard or protocol, including but not limited to the Global System of Mobile communication (GSM), the General Packet Radio Service (GPRS), the Code Division Multiple Access (CDMA), the Wideband Code Division Multiple Access (WCDMA), the Long Term Evolution (LTE), the Email and Short Messaging Service (SMS), etc.

The memory 920 may be configured to store software programs and modules. By running software programs and modules stored in the memory 920, the processor 980 can execute all kinds of functional applications and data processing in the mobile phone. The memory 920 may mainly include a program memory area and a data memory area. The program memory area may store an operating system and an application program required by at least one function (such as an audio playing function, an image displaying function and so on), etc. The data memory area may store data (such as audio data, a phonebook and so on) created according to the utilization of the mobile phone. Moreover, the memory 920 may include a high-speed random access memory or a non-volatile memory as well, such as, at least one disk memories, a flash memory or other volatile solid-state memory.

The input unit 930 may be configured to receive an inputted figure or character, or a key input which is relevant to user settings and functional control of the mobile phone. Specifically, the input unit 930 may include a touch-sensitive panel 931 and other input device 932. The touch-sensitive panel 931 is also referred to as a touch screen for collecting touch operations thereon or nearby by a user (such as operations on a touch-sensitive panel 931 or near a touch-sensitive panel 931 performed by a user through fingers, a touch pen and any other available objects or accessories) and driving a corresponding connected device based on a preset form. Optionally, the touch-sensitive panel 931 may include a touch detection device and a touch controller. The touch detection device is configured to detect a touch position of a user and a signal created by a touch operation, and send the signal to a touch controller. The touch controller is configured to receive touch information from a touch detection device and transform it to a touch spot coordinate, send the touch spot coordinate to the processor 980, and receive a command sent from the processor 980 and execute the command. Additionally, the touch-sensitive panel 931 may be implemented in multiple types such as a resistance type, a capacitance type, infrared rays and surface acoustic waves, etc. The input unit 930 may also include other input device 932 in addition to the touch-sensitive panel 931, and specifically, the other input device 932 may include but not limited to one or more of a physical keyboard, a functional key (such as a volume control key, an on/off key and so on), a trackball, a mouse and an operating lever, etc.

The display unit 940 may be configured to display information inputted by a user, or information provided to a user and various menus of the mobile phone. The display unit 940 may include a display panel 941, and optionally, the display panel 941 may be implemented with a liquid crystal display (LCD), an organic light-emitting diode (OLED) and so on. Furthermore, the touch-sensitive panel 931 may cover the display panel 941. When the touch-sensitive panel 931 detects a touch operation on it or nearby, the touch-sensitive panel 931 sends the touch operation to the processor 980 to determine a type of the touch event. Afterwards, the processor 980 provides a corresponding vision output on the display panel 941 according to the type of the touch event. Although in FIG. 9, the touch-sensitive panel 931 and the display panel 941 are two independent components to realize input and output functions of a mobile phone, in some embodiments, the touch-sensitive panel 931 and the display panel 941 may be integrated to realize input and output functions of the mobile phone.

The mobile phone may also include at least one kind of sensor 950, such as an optical sensor, a movement sensor and other sensors. Specifically, an optical sensor may include an ambient light sensor and a proximity sensor. The ambient light sensor can adjust the brightness of a display panel 941 according to ambient light, and the proximity sensor can shut off the display panel 941 and/or backlight when the mobile phone is moved to one's ear. As a kind of movement sensor, a gravity acceleration sensor can detect a magnitude of the acceleration in any direction (triaxial directions generally), and can detect a magnitude and direction of gravity in a case of stillness, which can be applied in an application requiring recognition of a mobile phone gesture (such as a landscape/portrait mode switching, a relevant game and magnetometer posture calibration), a function relevant to vibration recognition (such as a pedometer and a knock) and so on. For other sensors which may be equipped on the mobile phone, such as a gyroscope, a barometer, a hygrometer, a thermometer, an infrared sensor and so on, detailed descriptions are not made here for simplicity.

The audio circuit 960, a loudspeaker 961 and a microphone 962 can provide an audio interface between a user and the mobile phone. The audio circuit 960 can transmit a received electric signal, which is converted from audio data, to the loudspeaker 961, and the loudspeaker 961 converts the electric signal to a sound signal and output it. On the other hand, the microphone 962 converts a collected sound signal to an electric signal, and the electric signal is received and converted to audio data by the audio circuit 960. The audio data is outputted to a processor 980 and processed by the processor 980; and finally the processed audio data is sent to a device like a terminal through the RF circuit 910, or the audio data is outputted to a memory 920 for further processing.

WiFi is a short distance wireless transmission technology. The mobile phone can help a user to receive and send an email, browse a website and visit streaming media, etc. through the WiFi module 970 which provides wireless broadband internet access. Although the WiFi module 970 is shown in FIG. 9, it can be understood that, the WiFi module 970 is not a necessary component of the mobile phone and may be omitted as required without departing from the nature of the present disclosure.

The processor 980 is a control center of the mobile phone, which is configured to connect various parts of the mobile phone by using various kinds of interfaces and circuits, and execute various kinds of functions and process data of the mobile phone by running or executing software programs and/or modules stored in the memory 920 and calling data stored in the memory 920, thereby performing an overall monitoring on a mobile phone. Optionally, the processor 980 may include one or more processing units. Preferably, an application processor and a modulation-demodulation processor may be integrated into the processor 980. The application processor mainly processes an operating system, a user interface, an application program and so on; while the modulation-demodulation processor mainly processes a wireless communication. It can be understood that, the modulation-demodulation processor may not be integrated into the processor 980.

The mobile phone further includes a power supply 990 (a battery for example) to supply power to all components. Preferably, the power supply may logically connect to the processor 980 through a power management system to realize functions of charge management, discharge management and power management, etc.

Although not shown in the figure, the mobile phone may also include a camera, a bluetooth module, etc., which are not described here for simplicity.

Specifically, in this embodiment, the memory 920 stores one or more programs which are executed by one or one processors. The one or more programs include instructions used for executing the following operations: acquiring an original image, and acquiring a target shape; deforming the original image into a target image based on a ratio of deformation at the center of the original image to deformation at an edge of the original image, by fragmenting the original image; deforming all image fragments of the fragmented image, such that the further an edge of the target image is away from a center of the target image, the greater a deforming degree of the edge of the target image is, and a shape of the target image is the target shape; and displaying the target image.

The one or more programs further include instructions used for executing other operations in the above image deformation method shown in FIG. 1.

It should be noted that, the division of units in embodiments of the device is based on logic functions, and is not intended to be limited. Other division of units may be designed to achieve the corresponding functions. Additionally, the specific name of each functional unit is only for distinguishing and is not used to limit the scope of the present disclosure.

It should be understood by those skilled in the art that all or a part of steps in the methods of the above embodiments may be performed by a hardware which is instructed through a program. The program may be stored in a computer readable storage medium such as a ROM, a magnetic disk or an optical disk.

The foregoing description is merely illustrative of preferred embodiments of the disclosure, but the scope of the disclosure will not be limited thereto, and any variations or substitutions which can readily occur to those skilled in the art without departing from the spirit of the disclosure shall come into the scope as defined in the present disclosure and appended claims.

The invention claimed is:

1. An image deformation method, comprising:
   acquiring, by a processor, an original image, wherein the original image has a geometric point center, and acquiring a target shape;
   deforming, by the processor, the whole original image into a target image based on a ratio of deformation at the geometric point center of the original image to deformation at an edge of the original image, further comprising:
   fragmenting the original image into a plurality of image fragments;
   for each of the plurality of image fragments:

deforming the image fragment based on: (i) the ratio of deformation at the geometric point center of the original image to deformation at an edge of the original image and (ii) a corresponding distance between the image fragment and the geometric point center in the original image such that:
the further the image fragment is away from the geometric point center in the original image, the greater a deforming degree of a deformed counterpart image fragment of the image fragment in the target image; and
stitching all the plurality of deformed image fragments to form the target image; and
displaying, by the processor, the target image.

2. The image deformation method according to claim 1, wherein the acquiring a target shape comprises:
receiving a drawn graph, and determining a shape of the drawn graph as a target shape; or
receiving a graph selected from predefined graphs, and determining a shape of the selected graph as a target shape.

3. The image deformation method according to claim 1, wherein the fragmenting the original image comprises:
fragmenting the original image into the image fragments, wherein the further an image fragment is away from the geometric point center of the original image, the smaller an area of the image fragment is.

4. The image deformation method according to claim 1, wherein before deforming the whole original image into the target image, the image deformation method further comprises:
receiving a command of dragging the original image to the target shape, or receiving a command of selecting the target shape.

5. The image deformation method according to claim 1, wherein after the displaying the target image, or before the deforming the whole original image into a target image, the image deformation method further comprises:
displaying an adjusting interface for a deforming proportion parameter; and
receiving a value of the deforming proportion parameter.

6. The image deformation method according to claim 5, wherein the adjusting interface comprises:
an interface for adjusting the deforming proportion parameter through a slider; or
an interface for adjusting the deforming proportion parameter through a parameter input box.

7. An image deformation device, comprising one or more processors, configured to execute program instructions stored on storage medium to cause the image deformation device to:
acquire an original image, wherein the original image has a geometric point center;
acquire a target shape;
deform the whole original image into a target image based on a ratio of deformation at the geometric point center of the original image to deformation at an edge of the original image, further comprising:
fragment the original image into a plurality of image fragments;
for each of the plurality of image fragments:
deform the image fragment based on: (i) the ratio of deformation at the geometric point center of the original image to deformation at an edge of the original image and (ii) a corresponding distance between the image fragment and the geometric point center in the original image such that:
the further the image fragment is away from the geometric point center in the original image, the greater a deforming degree of a deformed counterpart image fragment of the image fragment in the target image; and
stitch all the plurality of deformed image fragments to form the target image; and
display the target image.

8. The image deformation device according to claim 7, wherein the one or more processors executes the program instructions to make the image deformation device further to:
receive a drawn graph, and determine a shape of the drawn graph as a target shape; or
receive a graph selected from predefined graphs, and determine a shape of the selected graph as a target shape.

9. The image deformation device according to claim 7, wherein the one or more processors executes the program instructions to make the image deformation device further to:
fragment the original image into the image fragments, wherein the further an image fragment is away from the geometric point center of the original image, the smaller an area of the image fragment is.

10. The image deformation device according to claim 7, wherein the one or more processors executes the program instructions to make the image deformation device further to:
receive a command of dragging the original image to the target shape, or receive a command of selecting the target shape before deforming the original image into the target image.

11. The image deformation device according to claim 7, wherein the one or more processors executes the program instructions to make the image deformation device further to:
display an adjusting interface for a deforming proportion parameter after displaying the target image or before deforming the original image into the target image; and
receive a value of the deforming proportion parameter.

12. The image deformation device according to claim 11, wherein the one or more processors executes the program instructions to make the image deformation device further to:
display an interface for adjusting the deforming proportion parameter through a slider; or
display an interface for adjusting the deforming proportion parameter through a parameter input box.

13. A non-volatile computer-readable storage medium, comprising a program instruction, wherein the program instruction, when executed by a processor of a calculating device, configures the storage medium to perform an image deformation method, and the method comprises:
acquiring an original image, wherein the original image has a geometric point center, and acquiring a target shape;
deforming the whole original image into a target image based on a ratio of deformation at the geometric point center of the original image to deformation at an edge of the original image, further comprising:
fragmenting the original image into a plurality of image fragments;
for each of the plurality of image fragments:
deforming the image fragment based on: (i) the ratio of deformation at the geometric point center of the original image to deformation at an edge of the original image and (ii) a corresponding distance between the image fragment and the geometric point center in the original image such that:

the further the image fragment is away from the geometric point center in the original image, the greater a deforming degree of a deformed counterpart image fragment of the image fragment in the target image; and stitching all the plurality of deformed image fragments to form the target image; and displaying, by the processor, the target image.

14. The non-volatile computer-readable storage medium according to claim 13, wherein the acquiring a target shape comprises:

receiving a drawn graph, and determining a shape of the drawn graph as a target shape; or receiving a graph selected from predefined graphs, and determining a shape of the selected graph as a target shape.

15. The non-volatile computer-readable storage medium according to claim 13, wherein the fragmenting the original image comprises:

fragmenting the original image into the image fragments, wherein the further an image fragment is away from the geometric point center of the original image, the smaller an area of the image fragment is.

16. The non-volatile computer-readable storage medium according to claim 13, wherein before deforming the original image into the target image, the image deformation method further comprises:

receiving a command of dragging the original image to the target shape, or receiving a command of selecting the target shape.

17. The non-volatile computer-readable storage medium according to claim 13, wherein after the displaying the target image, or before the deforming the whole original image into a target image, the image deformation method further comprises:

displaying an adjusting interface for a deforming proportion parameter; and receiving a value of the deforming proportion parameter.

18. The non-volatile computer-readable storage medium according to claim 17, wherein the adjusting interface comprises:

an interface for adjusting the deforming proportion parameter through a slider; or an interface for adjusting the deforming proportion parameter through a parameter input box.

* * * * *